United States Patent
Fitch et al.

(10) Patent No.: US 11,027,232 B2
(45) Date of Patent: Jun. 8, 2021

(54) METHODS FOR PRODUCING OZONE

(71) Applicant: Messer Industries USA, Inc., Bridgewater, NJ (US)

(72) Inventors: Frank R. Fitch, Bedminster, NJ (US); Steven Finley, Wayne, NJ (US)

(73) Assignee: Messer Industries USA, Inc., Wilmington, DE (US)

( * ) Notice: Subject to any disclaimer, the term of this patent is extended or adjusted under 35 U.S.C. 154(b) by 0 days.

(21) Appl. No.: 15/357,174

(22) Filed: Nov. 21, 2016

(65) Prior Publication Data

US 2017/0173514 A1    Jun. 22, 2017

Related U.S. Application Data

(60) Provisional application No. 62/270,126, filed on Dec. 21, 2015.

(51) Int. Cl.
| | | |
|---|---|---|
| *B01D 53/02* | (2006.01) | |
| *B01D 53/047* | (2006.01) | |
| *C01B 13/11* | (2006.01) | |
| *C01B 13/10* | (2006.01) | |

(52) U.S. Cl.
CPC ........... *B01D 53/047* (2013.01); *C01B 13/10* (2013.01); *C01B 13/11* (2013.01); *B01D 2253/106* (2013.01); *B01D 2253/108* (2013.01); *B01D 2256/14* (2013.01); *B01D 2257/106* (2013.01); *B01D 2259/40086* (2013.01); *C01B 2201/50* (2013.01); *C01B 2201/64* (2013.01)

(58) Field of Classification Search
CPC .... B01D 2257/106; B01D 2259/40086; B01D 53/047; C01B 13/10
See application file for complete search history.

(56) References Cited

U.S. PATENT DOCUMENTS

| | | | |
|---|---|---|---|
| 5,846,298 A | 12/1998 | Weist | |
| 6,409,801 B1 * | 6/2002 | Shen | B01D 53/02 423/700 |
| 6,916,359 B2 * | 7/2005 | Jain | C01B 13/0229 95/105 |
| 8,337,674 B2 | 12/2012 | Weist et al. | |
| 2001/0042691 A1 | 11/2001 | Izumi et al. | |
| 2008/0017590 A1 * | 1/2008 | Suchak | B01D 53/56 210/760 |
| 2009/0293717 A1 * | 12/2009 | Izumi | B01D 53/047 95/22 |
| 2010/0266463 A1 * | 10/2010 | Ota | B01D 53/047 422/186.11 |
| 2011/0052483 A1 * | 3/2011 | Tabata | B01D 53/04 423/581 |
| 2011/0123430 A1 * | 5/2011 | Koike | C01B 13/10 423/581 |
| 2013/0061750 A1 * | 3/2013 | Makihira | B01D 53/047 95/96 |
| 2013/0177497 A1 * | 7/2013 | Fitch | C02F 1/78 423/581 |
| 2015/0068365 A1 | 3/2015 | Golden et al. | |

FOREIGN PATENT DOCUMENTS

| | | |
|---|---|---|
| EP | 0 103 144 A2 | 8/1983 |
| GB | 1 536 345 A | 12/1978 |
| JP | 2013-040077 | 2/2013 |
| JP | 2014-129205 | 7/2014 |

* cited by examiner

*Primary Examiner* — Christopher P Jones
(74) *Attorney, Agent, or Firm* — Joshua L. Cohen

(57) ABSTRACT

A method for producing ozone is disclosed. The ozone is separated by an adsorbent separation system from a mixture of oxygen and ozone. The adsorbent separation system operates by adsorbing ozone at higher pressures, then desorbing the ozone at normal pressures. Increased ozone concentrations result from these steps while the oxygen component can be recovered and used in producing the mixture of oxygen and ozone.

11 Claims, No Drawings

METHODS FOR PRODUCING OZONE

CROSS REFERENCE TO RELATED APPLICATIONS

This application claims priority from U.S. Provisional Patent Application 62/270,126 filed on Dec. 21, 2015.

BACKGROUND OF THE INVENTION

Ozone is produced by passing a stream of air or oxygen through a corona discharge system which provides the energy to convert diatomic oxygen ($O_2$) to tri atomic oxygen ($O_3$). The reactive nature of ozone will typically limit the capability of ozone generators to produce ozone in concentrations greater than 12%.

Typically, ozone refers to that portion of an ozone mixture constituting tri-atomic oxygen ($O_3$). The ozone mixture refers to the combination of ozone and the remaining unconverted diatomic oxygen ($O_2$) or nascent oxygen (O) in addition to other elements or compounds such as nitrogen that further comprise the mixture.

Ozone generators typically produce an ozone mixture substantially consisting of oxygen (+/−90%) with a relatively low concentration of ozone remaining (+/−10%). To address the relatively high cost of ozone due to the inherent inefficiencies in the process, there are several technologies that utilize molecular sieves, including zeolites to adsorb ozone and allow the remaining oxygen to be recycled back to the inlet of the ozone generator. This technology can typically reduce the oxygen requirement for ozone production by 60 to 75%.

An additional expense that impacts the cost of ozone production is the cost of the power used to create the corona that supplies the energy needed to break up diatomic oxygen and enable ozone to form. It is known that the amount of energy required to produce a mole of ozone is directly related to the concentration of ozone in the ozone mixture. This is often expressed as specific power and is further expressed in units of kWhr/kg of ozone.

In one case, the specific power rises from 7.2 to 9.7 kWhr/kg of ozone; a specific power increase of 35% when the ozone concentration is increased from 6% to 10%. When the ozone concentration is increased from 6% to 12%, then the specific power rises from 7.2 to 12.3 kWhr/kg of ozone which is an increase of 71%.

It can be seen from then that there is an economic benefit to producing ozone at a lower concentration; however, lower concentration ozone can be less effective as a reactant for target process due to its lower partial pressure. Additionally, there is the added cost of designing associated equipment to accommodate the increased flow.

SUMMARY OF THE INVENTION

In one embodiment of the invention, there is disclosed a method for producing ozone from an oxygen and ozone mixture comprising the steps of adsorbing ozone in an adsorbent separation system at higher pressures and desorbing ozone at normal pressures.

In a second embodiment of the invention, there is disclosed an improved method for separating ozone from an oxygen and ozone mixture in an adsorbent separation system, the improvement comprising the steps of adsorbing ozone at higher pressures and then desorbing ozone at normal pressures.

The oxygen and ozone mixture is typically produced in an ozone generator such as a high voltage corona discharge ozone electric generator using air or oxygen as the feed gas. The ozone is present in the oxygen and ozone mixture in concentrations ranging from 3% to 15% with a range of 6% to 12% preferred.

The adsorbent separation system is typically a pressure swing adsorption (PSA) system which contains an adsorbent material such as silica gel, and/or high-silica zeolites, mordenite, ZSM-5 or Y-type zeolite for adsorbing ozone from a mixture of gaseous materials such as oxygen and ozone.

The pressure swing adsorption unit relies on selective adsorption of certain components (ozone) of a gas mixture compared to other components of the gas mixture (oxygen) being separated from those other components by contacting the gas mixture with an appropriate adsorbent under conditions, which promote the adsorption of the strongly adsorbed components. Typically, these processes are carried out at ambient temperatures. The upper temperature limit at which adsorption can occur is generally about 300° C. (ozone immediately destroyed at 400° C.) and is preferably in the range of not greater than 50° to 70° C.

Typically, the minimum absolute pressure at which the adsorption step is carried out is as high as 50 bara (bar absolute) or more but is preferably carried out at absolute pressures preferably not greater than 20 bara and more preferably not greater than about 15 bara. In a typical PSA process, pressure during the regeneration step is reduced usually to an absolute pressure in the range of about 0.1 to about 5 bara and preferably in an absolute pressure range of about 0.2 to about 2 bara.

The higher pressures of the present invention are typically pressures greater than 1 atmosphere or preferably 2 atmospheres. Normal pressures are typically 1.2 bara.

For ozone production, higher pressures can be 3 to 5 bara.

Preferably the higher pressures are at least 50% higher than normal pressures. More preferably, the higher pressures are 100% to 1000% higher than normal pressures with a range of 150% to 500% higher than normal pressures even more preferred.

The oxygen from the mixture of oxygen and ozone may be recovered and recycled back to the oxygen feed for the ozone generator thereby saving costs for the energy to produce oxygen.

The methods of the present invention provide for a lower cost for producing oxygen by recycling oxygen for reuse using pressure swing adsorption (PSA) technology.

DETAILED DESCRIPTION OF THE INVENTION

In multi-gas adsorption systems, the concentration of the adsorbed gas is limited by the partial pressure of that gas during adsorption. For example, ozone adsorbed at atmospheric pressure (1 Atma) at a concentration of 6% is limited to a maximum partial pressure of 0.06 Atma (0.06×1 Atma).

In a second example, ozone produced at a concentration of 6% is adsorbed at a pressure of 2 Atma. In this case, the maximum ozone partial pressure during adsorption is doubled to 0.12 atm for the same 6% inlet concentration. The partial pressure of any component in a multi-gas mixture is determined by multiplying the concentration (i.e., 0.06) by the total pressure (i.e., 2 Atm).

The benefit of higher pressure adsorption is realized following desorption which is always at a lower pressure. Following from the example above, pressure is reduced to 1

Atma during desorption; however, the partial pressure of the adsorbed ozone remains the same, 0.12 Atma. At the reduced pressure, the partial pressure of the ozone at the reduced pressure results in an effective ozone concentration of 12% or double the inlet concentration.

It can be seen from these examples that a benefit is derived from exploiting the effect of higher pressure adsorption. In the example above, the obvious benefit is the ability to increase the concentration of an adsorbed gas by proportionally increasing the feed pressure.

However, ozone generators are designed to produce ozone in a wide range of concentrations typically up to 12%.

It is not obvious from the above examples that an additional benefit can be derived through higher pressure adsorption. As discussed above, the specific power required to produce ozone is a function of its concentration. From this, it is easy to conclude that there is an economic benefit derived from producing ozone at the ozone generator at lower concentrations. The unit cost to produce a kilogram of ozone is heavily influenced by the concentration of ozone that is being produced.

The present invention enables one to produce ozone at lower concentration, hence at lower cost, then increase the concentration at the adsorption system by manipulating the adsorption/desorption pressures by way of the pressure swing. An earlier process employs an adsorption system where the adsorbent preferentially adsorbs ozone; allowing oxygen to pass through to be recovered for re-use. The benefit of this technology is primarily to reduce the cost to produce ozone by reducing the total oxygen requirement by re-using recovered oxygen. For this purpose, the pressure swing offers no real benefit. Ozone adsorbed in the adsorption bed can be recovered through a desorption step wherein a desorption gas; for example clean dry air, nitrogen or another weakly adsorbed gas is introduced into the adsorption bed and allowed to mix with the adsorbed ozone and transported from the adsorption bed as the desorption gas exits from the adsorption bed. Ozone mixes with the desorption gas by means of diffusion where the difference in partial pressure between the ozone in equilibrium with the adsorbed ozone and that of ozone in the desorption gas is the driving force.

However, by increasing the pressure swing and the resultant ozone concentration, the specific power cost to produce ozone will be reduced.

Oxygen supply systems, including cylinders, bulk storage tanks and pressure adsorption generators typically produce oxygen with pressures exceeding 2 Atm. (Vacuum swing adsorption systems often require the use on an oxygen blower to achieve the pressure required by a customer process as their oxygen product pressure may be only about 1.6 bar). They more typically produce oxygen at pressures exceeding 5 Atma. It is therefore not necessary to add equipment such as compressors nor is it necessary to consume the associated power required to increase the pressure of oxygen at a facility producing ozone. The oxygen pressure determines the limits for the ozone pressure in ozone producing equipment.

The oxygen source provides adequate pressure to exploit the benefits of a higher pressure swing cycle.

This invention therefore provides for the production of ozone at a given concentration utilizing a lower specific power. This will result in power savings ranging from 30 to 70% based on the power/concentration performance for generally available ozone generators.

Optionally, the invention can also combine these power-saving benefits with the ability to recover and re-use oxygen from the oxygen and ozone gas mixture produced by ozone generators.

The ozone mixture will be safer than conventional ozone produced without benefit of the adsorption technology because most of the oxygen in the gas mixture is displaced when air or another inert gas is used to purge the ozone from the adsorption bed as the concentration of oxygen in the mixture is reduced.

Further, the ability to produce ozone at higher and safer concentrations increases the effectiveness of ozone gas mixtures because the higher partial pressure provides a stronger driving force for reactions.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for producing ozone from an oxygen and ozone mixture, comprising:
    separating ozone present in an oxygen and ozone mixture in concentrations ranging from 6% to 12% by adsorbing the ozone in an adsorbent separation system at a higher pressure, wherein the ozone adsorbed in an adsorbent is in equilibrium with ozone at the partial pressure of ozone in the oxygen and ozone mixture;
    introducing a weakly adsorbed gas into the adsorption separation system;
    contacting the weakly adsorbed gas with the adsorbent at a lower pressure than the higher pressure, thereby desorbing ozone at a partial pressure that is the same as that during adsorption, to thereby produce an ozone stream at a higher concentration than that present in the adsorption; and
    transporting the desorbed ozone with the weakly adsorbed gas from the adsorption separation system.

2. The method as claimed in claim 1 further comprising producing the oxygen and ozone mixture in an ozone generator.

3. The method as claimed in claim 1 wherein the adsorbent separation system comprises a pressure swing adsorption system.

4. The method as claimed in claim 1 wherein the higher pressure is at least 50% higher than the pressure at which ozone is desorbed.

5. The method as claimed in claim 4 wherein the higher pressure is 100% to 1000% higher than the pressure at which ozone is desorbed.

6. The method as claimed in claim 5 wherein the higher pressure is 150% to 500% higher than the pressure at which ozone is desorbed.

7. The method as claimed in claim 1 wherein the higher pressure is greater than 1 atmosphere.

8. The method as claimed in claim 1 wherein the higher pressure is greater than 2 atmospheres.

9. The method as claimed in claim 1 wherein the pressure at which ozone is desorbed is 1.2 bara.

10. The method as claimed in claim 2 further comprising recovering oxygen from the oxygen and ozone mixture in the adsorbent separation system.

11. The method as claimed in claim 10 further comprising recycling the oxygen recovered from the adsorbent separation system to the ozone generator.

* * * * *